United States Patent
Zhang et al.

(10) Patent No.: US 9,344,160 B2
(45) Date of Patent: May 17, 2016

(54) DATA TRANSMISSION METHOD AND SYSTEM, TRANSMITTER, AND RECEIVER

(71) Applicant: FUJITSU LIMITED, Kawasaki-shi, Kanagawa (JP)

(72) Inventors: Jian Zhang, Beijing (CN); Yuantao Zhang, Beijing (CN); Yi Zhang, Beijing (CN); Yi Wang, Beijing (CN); Hua Zhou, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/197,907

(22) Filed: Mar. 5, 2014

(65) Prior Publication Data

US 2014/0185699 A1   Jul. 3, 2014

Related U.S. Application Data

(63) Continuation of application No. PCT/CN2011/079548, filed on Sep. 9, 2011.

(51) Int. Cl.
| | |
|---|---|
| *H04K 1/10* | (2006.01) |
| *H04L 27/28* | (2006.01) |
| *H04B 7/02* | (2006.01) |
| *H04B 7/04* | (2006.01) |
| *H04L 25/02* | (2006.01) |
| *H04B 7/06* | (2006.01) |

(52) U.S. Cl.
CPC ............. *H04B 7/024* (2013.01); *H04B 7/0473* (2013.01); *H04B 7/0639* (2013.01); *H04L 25/0204* (2013.01)

(58) Field of Classification Search
CPC ..... H04B 7/024; H04B 7/0473; H04B 7/0639
USPC .......................... 375/260, 267, 295, 316, 324
See application file for complete search history.

(56) References Cited

U.S. PATENT DOCUMENTS

| | | | |
|---|---|---|---|
| 2010/0239036 A1 | 9/2010 | Koo et al. | |
| 2010/0273495 A1 | 10/2010 | Onggosanusi et al. | |
| 2011/0158219 A1* | 6/2011 | Ko et al. | 370/344 |
| 2012/0275530 A1* | 11/2012 | Nazar et al. | 375/267 |

FOREIGN PATENT DOCUMENTS

| | | |
|---|---|---|
| CN | 101662319 A | 3/2010 |
| CN | 101873282 A | 10/2010 |
| CN | 101931442 A | 12/2010 |
| CN | 101984572 A | 3/2011 |
| WO | 2011020214 A1 | 2/2011 |

OTHER PUBLICATIONS

International search report issued for corresponding international application No. PCT/CN2011/079548, mailed May 31, 2012.

* cited by examiner

*Primary Examiner* — Freshteh N Aghdam
(74) *Attorney, Agent, or Firm* — Myers Wolin, LLC.

(57) ABSTRACT

A data transmission method and system, transmitter and receiver. The method includes: mapping, by a transmitter, a plurality of data streams to a plurality of antennas of the transmitter by using precoding matrices and transmitting the plurality of data streams to a receiver via the plurality of antennas, wherein the transmitter selects the precoding matrices by taking a resource block as a granularity. With the embodiments of the present invention, the transmitter may transmit data streams to the receiver by using the precoding matrices W, and selects the precoding matrices W by taking a resource block (RB) as a granularity, so as to support DM-RS demodulation, and the receiver is not needed to perform PMI feedback, which is also applicable to a scenario where user feedback is not supported or PMI feedback is inaccurate, thereby achieving open-loop spatial multiplexing CoMP transmission.

10 Claims, 5 Drawing Sheets

"Prior Art"

DATA TRANSMISSION METHOD AND SYSTEM, TRANSMITTER, AND RECEIVER

CROSS-REFERENCE TO RELATED APPLICATIONS

This is a continuation of International Application No. PCT/CN2011/079548, filed on Sep. 9, 2011, now pending, the contents of which are herein wholly incorporated by reference.

TECHNICAL FIELD

The present invention relates to the field of communications, and in particular to a data transmission method and system, transmitter and receiver.

BACKGROUND ART

Coordinated multi-point (CoMP) technology is an important content in the study of a long-term evolution advanced (LTE-A) scheme of a next-generation wireless communication system, which uses multiple cells for joint transmission, and may enhance a diversity effect, or suppress inter-cell interference, thereby improving the performance of the system.

The current CoMP technology is focused on the field of close-loop (having precoding matrix index (PMI) feedback) transmission, and its transmission technology may include joint processing (JP) and coordination scheduling/beamforming (CS/CB). Following description is given to JP.

FIG. 1 is a schematic diagram of JP transmission taking CoMP between two cells as an example. As shown in FIG. 1, Tx1 and Tx2 denote respectively a base station 1 and a base station 2. A base station here denotes various transmitters capable of CoMP operations, such as an eNB, and a remote radio head (RRH), etc. A base station is configured with $N_t$ transmission antennas, and Rx denotes a user receiver configured with $N_r$ receiving antennas. Multiple input multiple output (MIMO) channel matrices between the base stations 1 and 2 and a user are respectively denoted by $H_1$ and $H_2$, which are $N_r \times N_t$ dimension matrices. x denotes L data streams to be transmitting to a user, and the base stations 1 and 2 respectively use $N_t \times L$ dimension matrices $W_1$ and $W_2$ to map x to a plurality of antennas of itself for transmission. Wherein, $N_r$, $N_t$ and L are positive integers, and $L \leq N_r$. A vector symbol received by user equipment may be expressed as $y = H_1 W_1 x + H_2 W_2 x + n$, where, n denotes a noise vector.

In order to ensure the performance of CoMP transmission, the user equipment needs to feed back a precoding matrix index (PMI) according to the current channel state, so as to offer proposals to a base station for selecting precoding matrices $W_1$ and $W_2$.

However, in the implementation of the present invention, the inventors found that a defect exists in the above technology: the network end limits the total amount of feedback for the sake of the bearable feedback load; for example, the user equipment is not allowed to feed back at present, or the network end allows feeding back, but the PMI fed back by the user equipment cannot accurately reflect the current channel state, such as a scenario where the user equipment is in high-speed movement. This will bring negative effect to the performance of the close-loop CoMP transmission.

It should be noted that the above description of the background art is merely provided for clear and complete explanation of the present invention and for easy understanding by those skilled in the art. And it should not be understood that the above technical solution is known to those skilled in the art as it is described in the background art of the present invention.

SUMMARY OF THE INVENTION

An object of the embodiments of the present invention is to provide a data transmission method and system, transmitter and receiver. Wherein, the transmitter may transmit data streams to the receiver by using a matrix U, a matrix D and a precoding matrix W, and selects the precoding matrix W by taking a resource block (RB) as a granularity, without needing the receiver to feed back a PMI, and is applicable to a scenario where user feedback is not supported or PMI feedback is inaccurate, thereby achieving open-loop spatial multiplexing CoMP transmission.

According to one aspect of the embodiments of the present invention, there is provided a data transmission method, applicable to open-loop spatial multiplexing coordinated multipoint transmission, the method including: mapping, by a transmitter, multiple data streams to multiple antennas of the transmitter by using a precoding matrix and transmitting the multiple data streams to a receiver via the multiple antennas, wherein the transmitter selects the precoding matrix by taking a resource block as a granularity.

According to another aspect of the embodiments of the present invention, there is provided a data transmission method, including: receiving, by a receiver, data streams transmitted by more than one transmitter; performing channel estimation by the receiver by using a demodulation reference signal, so as to obtain an equivalent channel; and demodulating the received data streams by using the obtained equivalent channel, or by using the obtained equivalent channel, a phase rotation matrix and a unitary matrix, so as to obtain the data streams.

According to still another aspect of the embodiments of the present invention, there is provided a transmitter, including: a selecting unit configured to select a used precoding matrix by taking a resource block as a granularity; a precoding unit configured to map multiple data streams to multiple antennas of the transmitter by using the precoding matrix; and multiple antennas configured to transmit the multiple data streams to a receiver.

According to further still another aspect of the embodiments of the present invention, there is provided a receiver, including:

a second receiving unit configured to receive data streams transmitted by more than one transmitter;

a channel estimating unit configured to perform channel estimation by using a demodulation reference signal, so as to obtain an equivalent channel; and a demodulating unit configured to demodulate the received data streams by using the obtained equivalent channel, or by using the obtained equivalent channel, a phase rotation matrix and a unitary matrix, so as to obtain the data streams.

According to further still another aspect of the embodiments of the present invention, there is provided a data transmission system, including:

more than one transmitter, each of the transmitters including: a selecting unit configured to select a used precoding matrix by taking a resource block as a granularity; a precoding unit configured to map multiple data streams to multiple antennas of the transmitter by using the precoding matrix selected by the selecting unit, and multiple antennas configured to transmit the multiple data streams to a receiver; and a receiver, including a receiving unit configured to receive data streams transmitted by more than one transmitter; a channel estimating unit configured to perform channel estimation by using a demodulation reference signal, so as to obtain an equivalent channel; and a demodulating unit configured to demodulate the received data streams by using the obtained equivalent channel.

According to further still another aspect of the embodiments of the present invention, there is provided a computer-readable program, wherein when the program is executed in a transmitter, the program enables a computer to carry out the data transmission method as described above in the transmitter.

According to further still another aspect of the embodiments of the present invention, there is provided a storage medium in which a computer-readable program is stored, wherein the computer-readable program enables a computer to carry out the data transmission method as described above in a transmitter.

According to further still another aspect of the embodiments of the present invention, there is provided a computer-readable program, wherein when the program is executed in a receiver, the program enables a computer to carry out the data transmission method as described above in the receiver.

According to further still another aspect of the embodiments of the present invention, there is provided a storage medium in which a computer-readable program is stored, wherein the computer-readable program enables a computer to carry out the data transmission method as described above in a receiver.

The advantage of the embodiments of the present invention resides in that the transmitter may transmit data streams to the receiver by using a matrix U, a matrix D and a precoding matrix W, and selects the precoding matrix W by taking a resource block (RB) as a granularity, so as to support DM-RS demodulation, without needing the receiver to feed back a PMI, and is applicable to a scenario where user feedback is not supported or PMI feedback is inaccurate, thereby achieving open-loop spatial multiplexing CoMP transmission.

With reference to the following description and drawings, the particular embodiments of the present invention are disclosed in detail, and the principle of the present invention and the manners of use are indicated. It should be understood that the scope of the embodiments of the present invention is not limited thereto. The embodiments of the present invention contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The above and other objects, features and advantages of the present invention will be apparent from the following detailed description in conjunction with the drawings, in which.

DETAILED DESCRIPTION OF THE INVENTION

Various embodiments of the present invention shall be described below with reference to the accompanying drawings. These embodiments are illustrative only and are not intended to limit the present invention. For easy understanding of the principle and embodiments of the present invention by those skilled in the art, the embodiments of the present invention shall be described taking open-loop spatial multiplexing CoMP transmission of an LTE-A system as an example. However, it should be understood that the present invention is not limited thereto, and is applicable to other systems related to data transmission.

In the embodiments of the present invention, in the implementation of the present invention, the inventors found that in open-loop transmission, a user is not needed to feed back PMI, and it is more applicable to a scenario where user feedback is not supported or PMI feedback is inaccurate. Hence, the embodiments of the present invention provide a data transmission method and system, transmitter and receiver.

In this embodiment, in order to keep the compatibility with the LTE standard, the open-loop CoMP transmission is constructed on the basis of a framework of large delay cyclic delay diversity (CDD) of Rel. 8.

The large delay CDD of Rel. 8 shall be described first. The large delay CDD is a method used for single-user multiple input multiple output (SU-MIMO) open-loop spatial multiplexing transmission, with no need of PMI feedback, and its typical transmitting and receiving relation is expressed as: y=WDUx. Similar to the operations of a single base station in the previous CoMP scenario, x denotes multiple data streams transmitted to a user equipment, and WDU may be integrally seen as a precoding matrix, which is used to map data streams to an antenna for transmission. Due to open-loop spatial multiplexing transmission, the base station may adjust WD by taking a resource element (RE) as a granularity, that is, the matrices W and D are adjusted as per each RE; wherein, the matrices W and D may be selected in a manner defined in the standard, which shall not be described herein any further.

In the embodiments of the present invention, the open-loop CoMP transmission is performed on the basis of the framework of large delay CDD, and a precoding matrix is adjusted according to a granularity of an RB in consideration of demodulation of a demodulation reference signal (DM-RS) in the CoMP transmission, for the convenience of demodulation of the DM-RS. Embodiments of the present invention shall be described below with reference to the accompanying drawings.

Figure 1:
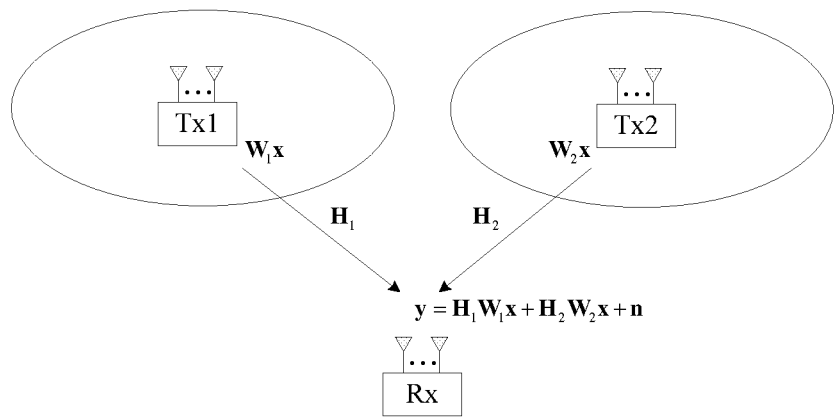
FIG. 1 is a schematic diagram of JP transmission taking CoMP between two cells as an example.
Figure 2:
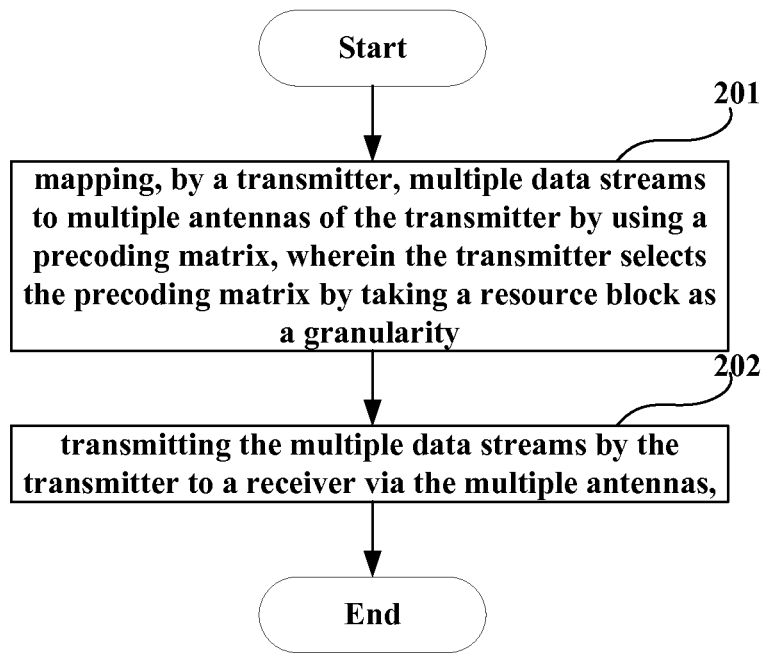
FIG. 2 is a flowchart of the data transmission method of Embodiment 1 of the present invention.

FIG. 2 is a flowchart of the data transmission method of Embodiment 1 of the present invention. As shown in FIG. 2, the method includes:

step 201: mapping, by a transmitter, multiple data streams to multiple antennas of the transmitter by using a precoding matrix W;

in this embodiment, different from the prior art, the precoding matrix W may be selected by taking an RB as a granularity, that is, RBs may be adjusted one by one, so as to support demodulation of a DM-RS in CoMP transmission;

wherein, the multiple data streams may be data streams after being processed with respect to modulation and rate match etc, the processes of the modulation and rate match etc being similar to those of the prior art, which shall not be described herein any further;

step 202: transmitting the multiple data streams by the transmitter to a receiver via the multiple antennas, wherein the data streams are transmitted to the receiver in a form of vector symbol after being precoded by using the precoding matrix W.

It can be seen from the above embodiment that in open-loop spatial multiplexing CoMP transmission, a precoding matrix is adjusted according to a granularity of an RB, so as to support DM-RS demodulation, and the receiver is not needed to perform PMI feedback, which is also applicable to a scenario where user feedback is not supported or PMI feedback is inaccurate.

In this embodiment, before precoding the multiple data streams by using the precoding matrix W, the method further includes a step of: pre-processing the multiple data streams, that is, passing the multiple data streams through a unitary matrix U, so that each of the multiple data streams experiences similar channel conditions; and then passing the multiple data streams through a phase rotation matrix D, so as to obtain a frequency diversity; wherein, this step is optional.

In the following description, a unitary matrix is referred to as matrix U, and a phase rotation matrix is referred to as matrix D.

In this embodiment, the matrix D may still be adjusted according to a granularity of an RE, so as to fully exploit and use a frequency diversity, and a small granularity may better use a gain brought by the frequency diversity; the matrix U may be determined in advance; and both of the transmitter and the receiver may learn in advance the matrix U, the matrix D and a rule for selecting the precoding matrix W.

Furthermore, in step 201, the multiple data streams may be mapped to the multiple antennas of the transmitter by using any technology of the prior art. Following description is given taking two data streams, that is, L=2, and 4 transmitting antennas, are transmitted as an example; wherein the data streams are transmitted by using the matrix U, the matrix D and the precoding matrix W.

If $x=[x_1, x_2]^T$ denotes the two data streams to be transmitted to the receiver, the matrix U and the matrix D may be respectively selected as $$U = \begin{bmatrix} 1 & 1 \\ 1 & e^{-j2\pi/2} \end{bmatrix}, \quad D = \begin{bmatrix} 1 & 0 \\ 0 & e^{-j2\pi i/2} \end{bmatrix}$$

according to the standard; where, i denotes an RE index; the precoding matrix W is selected in a codebook of 4 antennas and the number of layers being 2; for example, N available precoding matrices may be designated in advance in the codebook, N≤16, and a W is cyclically selected in the N precoding matrices in a manner of RB by RB, or for each RB, a W is randomly selected from 16 precoding matrices in a codebook of 4 antennas and the number of layers being 2. It can be seen from the above embodiment that on the basis of a CDD framework, the transmitter may transmit the data streams to the receiver by using the matrix U, the matrix D and the precoding matrix W, and select the precoding matrix W by taking an RB as a granularity, so as to support DM-RS demodulation, and the receiver is not needed to perform PMI feedback, which is also applicable to a scenario where user feedback is not supported or PMI feedback is inaccurate, thereby achieving open-loop spatial multiplexing CoMP transmission.

In this embodiment, in using DM-RS demodulation, the method may further include: transmitting a DM-RS by the transmitter to the receiver by using the precoding matrix W, so that the receiver performs channel estimation according to the DM-RS, thereby obtaining an equivalent channel, and making the receiver to perform demodulation recovery on the data streams, i.e. vector symbols, transmitted by the transmitter, according to the equivalent channel, the matrix D and the matrix U, so as to obtain the data streams. Wherein, the DM-RS may be mapped to the antennas together with the multiple data streams at the same time, and is transmitted to the receiver via the antennas.

In this embodiment, before step 201, the method may further include a step of:

receiving, by the transmitter, an original SU-MIMO channel quality indicator and an amount of change ΔCQI of the channel quality indicator fed back by the receiver, and obtaining a channel quality indicator CQI' of current open-loop CoMP according to the amount of change ΔCQI and the original SU-MIMO channel quality indicator CQI; wherein the CQI' can be obtained by adding the CQI to the ΔCQI;

and then processing the multiple data streams according to the current channel quality indicator CQI', and conveying the processed multiple data streams into the precoding matrix W; wherein, the step of processing the multiple data streams according to the current channel quality indicator CQI' may include performing coded modulation scheme selection, and rate match, etc., on the multiple data streams, which are similar to those in the prior art, and shall not be described herein any further.

In this embodiment, if the multiple data streams are pre-processed by using the matrix U and the matrix D before being conveyed into the precoding matrix W, the transmitter processes the multiple data streams according to the current channel quality indicator CQI', conveys the processed multiple data streams into the matrix U, and then conveys into the precoding matrix W after passing through the matrix D.

In this embodiment, the transmitter may select the precoding matrix W RB by RB in a predefined manner, wherein, for the same RB, the precoding matrix W used by the transmitter is identical to or different from the precoding matrices used by other transmitters.

In an embodiment, the transmitter cyclically selects the precoding matrix W RB by RB in a predefined order, the number of the precoding matrices used in each cycle being related to the number of antenna ports of the transmitter and being less than or equal to the number of precoding matrices available in a codebook. In this case, a predefined number of precoding matrices may be selected in advance, and then the precoding matrices are cyclically used in a predefined order.

For example, when the number of the antenna ports of the transmitter is 2, the number of the used precoding matrices W in each cycle may be 2 or 3.

In this embodiment, as spatial multiplexing is used, the number of layers (equaling to the number of the data streams) is always greater than 1. Therefore, when it is specified in a standard that the number of the antennas is 2, there are total 3 precoding matrices available for selection, wherein, the used precoding matrices W may be any 2 or 3 in 3 precoding matrices to which a codebook of 2 antennas specified in a standard corresponds; and the precoding matrices to which the codebook of 2 antennas corresponds is shown in Table 1, corresponding to a case where the number of the layers v=2. If 2 precoding matrices are selected from them, the 2 precoding matrices may form one cycle; and if 3 precoding matrices are selected from them, one cycle may be formed by the 3 precoding matrices.

TABLE 1

| Codebook index | Number of layers $\upsilon$ | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\1 & -1\end{bmatrix}$ |
| 3 | $\frac{1}{\sqrt{2}}\begin{bmatrix}1\\-j\end{bmatrix}$ | — |

For example, if the number of the antenna ports of the transmitter is 4, the number of the precoding matrices W used in each cycle may be any value between 1 and 16; for example, a precoding matrix is selected RB by RB in each cycle in an predefined order of $W_1, W_2, \ldots, W_N$ (N≥16). For example, in this embodiment, the used precoding matrices W are any 4 of 16 precoding matrices to which a codebook of 4 antennas specified in a standard corresponds, or the last 4 precoding matrices, i.e. precoding matrices to which codebook indices 12-15 correspond, in 16 precoding matrices to which a codebook of 4 antennas corresponds, are only taken, as shown in Table 2. In practical application, a corresponding vector u is obtained first from Table 2, and then a precoding matrix is obtained according to u, obtaining the precoding matrix being similar to the prior art, which shall not be described herein any further.

In another embodiment, the precoding matrix used by the transmitter in each cycle is identical to the precoding matrices selected by other transmitters, but the orders for selecting the precoding matrices may be identical or different.

In a case where the orders for selecting the precoding matrices are different, the transmitter may, for example, cyclically select the precoding matrix W RB by RB in an order reverse to that in which other transmitters select precoding matrices, that is, in an reverse order for selecting precoding matrices by other transmitters; for example, in each cycle, if the order for selecting precoding matrices by other transmitters is $W_1, W_2, W_3, W_4$, the order for selecting the precoding matrix by the transmitter is a reserve order for selecting precoding matrices by other transmitters, i.e. $W_4, W_3, W_2, W_1$.

Furthermore, the transmitter may, together with other transmitters, select an order of precoding matrices in a manner of cyclic shift, which shall be described taking 4 matrices $W_1, W_2, W_3, W_4$ as an example, wherein, the transmitter is noted as transmitter 1, and there are 4 other transmitters, noted respectively as transmitter 2, transmitter 3, transmitter 4 and transmitter 5. If the precoding matrices are ordered in a manner of cyclic shift, the order of the transmitter 1 is $W_1, W_2, W_3, W_4$, the order of the transmitter 2 is $W_2, W_3, W_4, W_1$, the order of the transmitter 3 is $W_3, W_4, W_1, W_2$, the order of the transmitter 4 is $W_4, W_3, W_2, W_1$, and the order of the transmitter 5 is $W_1, W_2, W_3, W_4$.

In another embodiment, the transmitter may randomly select the used precoding matrix W RB by RB. For example, when the number of the antenna ports is 4, the transmitter may randomly select one precoding matrix W RB by RB each time from Table 2, while the order of the other transmitters for selecting precoding matrices may still be $W_1, W_2, W_3, W_4$.

In this embodiment, the transmitter may select the matrix D according to a granularity of an RE.

In this embodiment, the matrix U may be predetermined and may be constant. For example, the matrices U and D may be selected by using the matrices specified in a standard according to the number of the layers, i.e. the number of the data streams, as shown in Table 3. In Table 3, i denotes an RE index.

TABLE 2

| Codebook index | $u_n$ | Number of layers $\upsilon$ | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

TABLE 3

| Number of layers ν | Matrix U | Matrix D (i) |
|---|---|---|
| 2 | $\frac{1}{\sqrt{2}}\begin{bmatrix} 1 & 1 \\ 1 & e^{-j2\pi/2} \end{bmatrix}$ | $\begin{bmatrix} 1 & 0 \\ 0 & e^{-j2\pi i/2} \end{bmatrix}$ |
| 3 | $\frac{1}{\sqrt{3}}\begin{bmatrix} 1 & 1 & 1 \\ 1 & e^{-j2\pi/3} & e^{-j4\pi/3} \\ 1 & e^{-j4\pi/3} & e^{-j8\pi/3} \end{bmatrix}$ | $\begin{bmatrix} 1 & 0 & 0 \\ 0 & e^{-j2\pi i/3} & 0 \\ 0 & 0 & e^{-j4\pi i/3} \end{bmatrix}$ |
| 4 | $\frac{1}{2}\begin{bmatrix} 1 & 1 & 1 & 1 \\ 1 & e^{-j2\pi/4} & e^{-j4\pi/4} & e^{-j6\pi/4} \\ 1 & e^{-j4\pi/4} & e^{-j8\pi/4} & e^{-j12\pi/4} \\ 1 & e^{-j6\pi/4} & e^{-j12\pi/4} & e^{-j18\pi/4} \end{bmatrix}$ | $\begin{bmatrix} 1 & 0 & 0 & 0 \\ 0 & e^{-j2\pi i/4} & 0 & 0 \\ 0 & 0 & e^{-j4\pi i/4} & 0 \\ 0 & 0 & 0 & e^{-j6\pi i/4} \end{bmatrix}$ |

Figure 3:
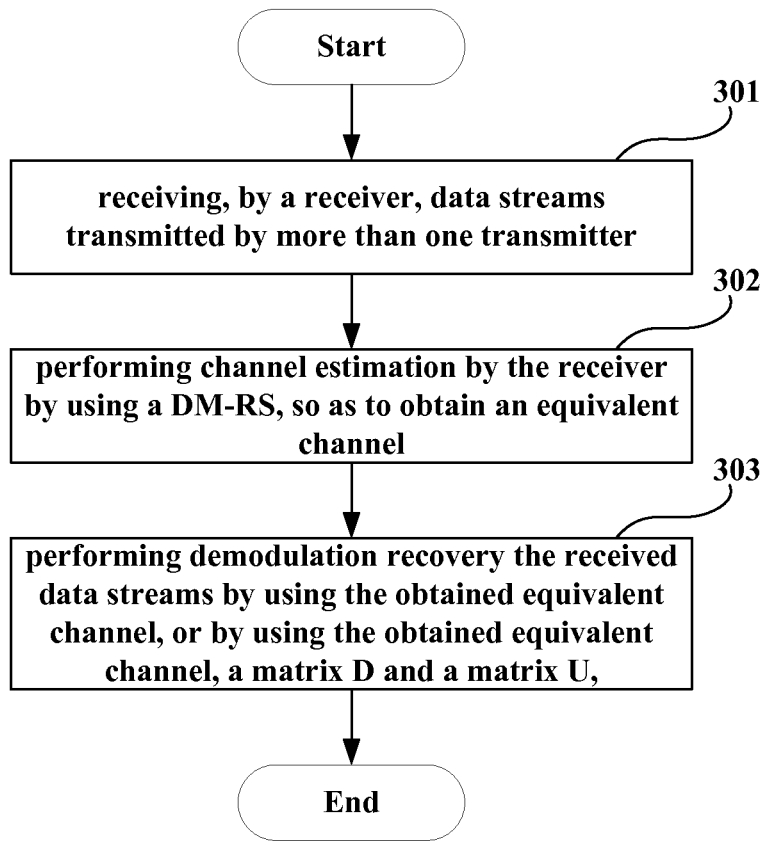
FIG. 3 is a flowchart of the data transmission method of Embodiment 2 of the present invention.

FIG. 3 is a flowchart of the data transmission method of Embodiment 2 of the present invention. As shown in FIG. 3, the method includes:

step 301: receiving, by a receiver, data streams transmitted by more than one transmitter;

wherein, the data streams are pre-coded vector symbols;

step 302: performing channel estimation by the receiver by using a demodulation reference signal (DM-RS), so as to obtain an equivalent channel;

wherein, one of the transmitters may transmit the DM-RS by using a respective precoding matrix W, and the receiver may estimate equivalent channels in REs of a certain density after receiving the DM-RS, thereby obtaining an equivalent channel in each RE by using an interpolation algorithm;

step 303: demodulating, by the receiver, the received data streams by using the obtained equivalent channel, or by using the obtained equivalent channel, a matrix D and a matrix U, so as to obtain the data streams;

wherein, in the case where the transmitter maps the multiple data streams to its antennas by using the precoding matrix W, the data streams transmitted by the transmitter may be demodulated and recovered by using an existing MIMO detection technology after the receiver obtains the equivalent channel, so as to obtain the data streams;

and in the case where the transmitter maps the multiple data streams to its antennas by using the matrix U, the matrix D and the precoding matrix W, the data streams transmitted by the transmitter may be demodulated and recovered by using an existing MIMO detection technology after the receiver obtains the equivalent channel, the matrix D and the matrix U, so as to obtain the data streams.

Furthermore, the method further includes: feeding back an original SU-MIMO channel quality indicator CQI and an amount of change ΔCQI of the channel quality indicator by the receiver to the transmitter. In this way, after the above information is obtained, a channel quality indicator CQI' of current open-loop CoMP transmission may be obtained according to the above information, and coded modulation scheme selection, and rate match, etc., may be performed by using the CQI'.

In this embodiment, based on CSI-RS channel estimation, the receiver obtains the CQI on an assumption of SU-MIMO transmission condition and obtains the CQI' on an assumption of open-loop CoMP transmission condition, calculates a difference value ΔCQI=CQI'−CQI, and looks up a mapping table worked out in advance for the ΔCQI, so as to quantize the ΔCQI, the process of quantization of the SU-MIMO CQI being identical to that in an existing standard, and then the quantized ΔCQI, together with the CQI of the SU-MIMO, are fed back to the transmitter. The feedback of the ΔCQI enables the transmitter to select a more accurate transmission parameter for the open-loop CoMP transmission, such as a coded modulation scheme, and rate match, etc., such that the performance advantage of the CoMP transmission may be more fully exerted.

It can be seen from the above embodiment that with the open-loop spatial multiplexing CoMP transmission, the receiver is not needed to perform PMI feedback, and the method is also applicable to a scenario where user feedback is not supported or PMI feedback is inaccurate.

Figure 4:
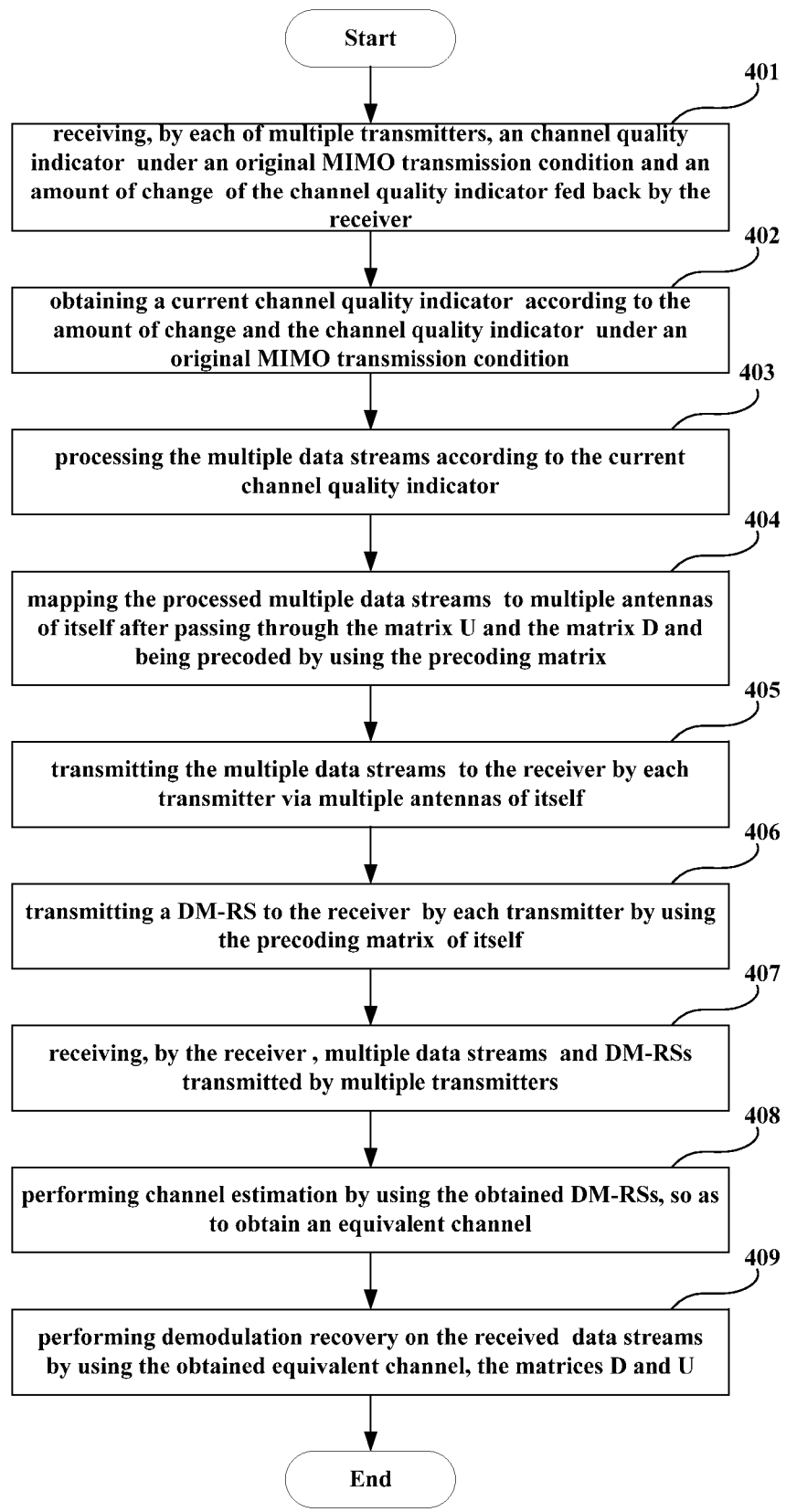
FIG. 4 is a flowchart of the data transmission method of Embodiment 3 of the present invention.

FIG. 4 is a flowchart of the data transmission method of Embodiment 3 of the present invention. In this embodiment, description is given taking that the transmitter obtains the CQI' according to the ΔCQI and CQI fed back by the receiver, passes the data streams through the matrix U and the matrix D after processing the data streams with respect to selection of coded modulation scheme, and rate match, etc., by using the CQI', and then maps the data streams to the antennas of itself by using the precoding matrix W, as an example. Wherein, a receiver R receives multiple data streams transmitted by multiple transmitters. The number of the transmitters is n, the number of antennas configured for each transmitter $T_i$ is $N_t$, the number of antennas configured for the receiver is $N_r$, and the MIMO channel matrix between an i-th transmitter $T_i$ and the receiver R is expressed as $H_i$, where, i=1, 2, . . . , n, which is a $N_r \times N_t$ dimension matrix. Data streams transmitted by each transmitter $T_i$ to the receiver R are L data streams. A precoding matrix W is a $N_t \times L$ dimension matrix, and the matrix D and the matrix U are both L×L matrices. Wherein, the number $N_r$ of the antennas of the receiver is greater than or equal to 2, and L is less than or equal to the number $N_r$ of the antennas of the receiver; and $N_r$, $N_t$, L and n are all positive integers.

At the transmission end:

step 401: receiving, by each of multiple transmitters, an channel quality indicator CQI under an original MIMO transmission condition and an amount of change ΔCQI of the channel quality indicator fed back by the receiver;

step 402: obtaining a current channel quality indicator CQI' by the multiple transmitters according to the amount of change ΔCQI and the channel quality indicator CQI under an original MIMO transmission condition;

wherein, the CQI' may be obtained by adding the CQI to the ΔCQI;

step 403: processing the multiple data streams according to the current channel quality indicator CQI';

wherein, the processing may include selection of a transmission parameter for the multiple data streams, such as selection of a coded modulation scheme, and rate match, etc., and after being processed, the data streams are vector symbols;

step 404: mapping the processed multiple data streams x to multiple antennas of itself after passing through the matrix U and the matrix D and being precoded by using the precoding matrix W;

in this embodiment, each of the n transmitters maps L data streams x to $N_t$ antennas of itself by using the matrix U and the matrix D in turn and passing the data streams through the precoding matrix W;

wherein, the processing of the multiple data streams by using the matrix U and the matrix D is as described in Embodiment 1, which shall not be described herein any further;

wherein, each transmitter selects a used precoding matrix W by taking an RB as an granularity, the rule for selecting the used precoding matrix W being similar to that in Embodiment 1;

the matrix D may be adjusted according to an granularity of an RE, and the matrix U may be predetermined, as shown in Table 3;

step 405: transmitting the multiple data streams x to the receiver by each transmitter via multiple antennas of itself;

in this embodiment, each transmitter transmits the L data streams x to the receiver via $N_t$ antennas of itself; wherein, the data streams x are transmitted to the receiver R in a form of vector symbol after being precoded by using a precoding matrix W;

step 406: transmitting a DM-RS to the receiver R by each transmitter by using the precoding matrix $W_i$ of itself;

wherein, the DM-RS and the data streams may be transmitted to the receiver R at the same time via the antennas.

At the receiving end:

step 407: receiving, by the receiver R, multiple data streams x and DM-RSs transmitted by multiple transmitters;

in this embodiment, the receiver R may receive L data streams x and DM-RSs transmitted by n transmitters at the same time; wherein, the received vector symbols may be expressed as:

$$y = \left\{\sum_{i=1}^{n}(H_iW_iDUx)\right\} + n = \left\{\sum_{i=1}^{n}(H_iW_i)DUx\right\} + n \quad (1)$$

in formula (1), n denotes a noise vector;

step 408: performing channel estimation by the receiver R by using the obtained DM-RSs, so as to obtain an equivalent channel;

wherein, the receiver R may estimate equivalent channels in REs of a certain density, and further obtains an equivalent channel in each RE by using an interpolation algorithm, i.e.

$$\sum_{i=1}^{n} H_iW_i;$$

furthermore, the equivalent channel may also be obtained by using any other algorithms in the prior art, which shall not be described here any further;

step 409: performing demodulation recovery on the received L data streams x by the receiver R by using the obtained equivalent channel, the matrices D and U;

in this embodiment, the matrix D may be determined according an RE, and the matrix U may be learnt in advance; in this way, the receiver R may obtain $$\left\{\sum_{i=1}^{n}(H_iW_i)DU\right\},$$

and perform demodulation recovery on the data streams in formula (1), i.e. transmission vectors x, by using an existing MIMO detection technique after obtaining the $$\left\{\sum_{i=1}^{n}(H_iW_i)DU\right\};$$

for example, for a receiver of minimum mean square error (MMSE), the detection of the transmission vectors x in formula (1) is as follows:

let $$H_e = \left\{\sum_{i=1}^{n}(H_iW_i)DU\right\},$$

the relationship between reception and transmission in formula (1) may be expressed as:

$$y = H_e x + n \quad (2);$$

after $H_e$ is learnt, the receiver may construct a reception matrix by itself; for example, a reception matrix is:

$$R^H = (H_e^H H_e + \sigma^2 I)^{-1} H_e^H \quad (3);$$

and the vector symbol to be performed demodulation recovery is:

$$\hat{x} = R^H y \quad (4);$$

in this way, the receiver may obtain a reception matrix $R^H$ according to the learnt $$H_e = \left\{\sum_{i=1}^{n}(H_iW_i)DU\right\},$$

and then performs demodulation recovery on the data streams x according to the reception matrix $R^H$ and the received data streams, i.e. symbol vectors y.

Furthermore, the method may further include a step of: feeding back, by the receiver, an original SU-MIMO channel quality indicator CQI and an amount of change ΔCQI of the channel quality indicator, to the transmitters. In this way, after obtaining the above information, a channel quality indicator CQI' of current open-loop CoMP transmission may be obtained according to the above information, and coded modulation scheme selection, and rate match, etc., may be performed by using the CQI', the manner of obtaining the amount of change ΔCQI of the channel quality indicator being as described in Embodiment 3, which shall not be described herein any further. And this step may be carried out before or after step 407, step 408, or step 409, and may be determined as actually required.

In another embodiment, in step 404, each transmitter may further convey the processed multiple data streams directly into the precoding matrix W for precoding, and then transmit to the receiver via the antennas. In this way, in step 407, the receiver R may receive L data streams x and DM-RSs transmitted by n transmitters at the same time; wherein, the received vector symbols may be expressed as:

$$y = \left\{\sum_{i=1}^{n}(H_i W_i x)\right\} + n. \quad (5)$$

In step 408, the receiver R may perform channel estimation by using the obtained DM-RSs, so as to obtain an equivalent channel; wherein, the receiver R may estimate equivalent channels in REs of a certain density, and further obtains an equivalent channel in each RE by using an interpolation algorithm, i.e.

$$\sum_{i=1}^{n} H_i W_i.$$

In step 409, the receiver R may perform demodulation recovery on the received L data streams x by using the obtained equivalent channel;

In this embodiment, after obtaining the equivalent channel $$\sum_{i=1}^{n} H_i W_i,$$

the receiver R may perform demodulation recovery on the data streams in formula (5), i.e. transmission vectors x by using an existing MIMO detection technique.

For example, for a receiver of minimum mean square error (MMSE), the detection of the transmission symbols x in formula (5) is as follows:

let $$H_e = \sum_{i=1}^{n} H_i W_i,$$

the relationship between reception and transmission in formula (5) may be expressed as:

$$y = H_e x + n \quad (6);$$

after $H_e$ is learnt, the receiver may construct a reception matrix by itself; for example, a reception matrix is:

$$R^H = (H_e^H H_e + \sigma^2 I)^{-1} H_e^H \quad (7);$$

and the vector symbol to be performed demodulation recovery is:

$$\hat{x} = R^H y \quad (8);$$

in this way, the receiver may obtain a reception matrix $R^H$ according the learnt $H_e$, and then performs demodulation recovery on the data streams x according to the reception matrix $R^H$ and the received data streams, i.e. symbol vectors y. In the above formula, σ denotes a noise variance, which is known to the receiver.

Following description is given taking that the number of the transmitters is n=2, the number of antennas configured for each transmitter $T_i$ is $N_t$=4, the number of antennas configured for the receiver R is $N_r$=2, an MIMO channel matrix between an i-th transmitter $T_i$ and the receiver R is expressed as H which is a 2×4 dimension matrix, as an example. The data streams transmitted by each transmitter $T_i$ to the receiver R are L data streams. The precoding matrix W is a 4×L dimension matrix, and the matrix D and the matrix U are both L×L matrices; where, i=1, 2, L=2.

In such a case, in step 401, 2 transmitters map 2 data streams x to 4 antennas of themselves by using the matrix U, the matrix D and precoding matrices $W_1$ and $W_2$ of themselves in turn;

wherein, each transmitter selects the used precoding matrices $W_1$ and $W_2$ taking an RB as an granularity, the rules for selecting the precoding matrices $W_1$ and $W_2$ are multiple, as described in Embodiment 1;

for example, in this embodiment, the precoding matrices are selected by using the following manners.

A first manner:

2 transmitters cyclically select the precoding matrices $W_1$ and $W_2$ RB by RB in a predefined order, the number of precoding matrices used in each cycle being 4.

For example, the 4 precoding matrices are W(1), W(2), W(3), W(4) in turn.

For the same RB, the precoding matrices selected by the 2 transmitters may be identical or different. In this embodiment, for example, one of the transmitters cyclically selects the precoding matrix $W_1$ in an order of W(1), W(2), W(3), W(4), and the other transmitter cyclically selects the precoding matrix $W_2$ in an order reverse to that in which the one transmitter selects the precoding matrix, that is, W(4), W(3), W(2), W(1). However, it is not limited thereto, and other manners may be used for selection.

The above 4 precoding matrices may be randomly selected from 16 precoding matrices specified in a codebook of 4 antennas, and may also be selected as the last 4 of the 16 precoding matrices, as shown in Table 2.

A second manner:

one of the 2 transmitters cyclically selects the precoding matrix $W_1$ RB by RB in a predefined order, and the other one of the transmitters randomly selects the precoding matrix $W_2$, the number of precoding matrices used in each cycle being 4.

For the same RB, the precoding matrices selected by the 2 transmitters may be identical or different. In this embodiment, for example, one of the transmitters cyclically selects the precoding matrix $W_1$ in an order of W(1), W(2), W(3), W(4); for example, the 4 precoding matrices may be randomly selected from 16 precoding matrices specified in a codebook of 4 antennas, and may also be selected as the last 4 of the 16 precoding matrices, as shown in Table 2. And the other one of the transmitters randomly selects the precoding matrix $W_2$ in each cycle; for example, the 4 precoding matrices used in each cycle may be randomly selected from 16 precoding matrices specified in a codebook of 4 antennas.

Furthermore, in step 401, the matrices D and U used by the 2 transmitters are identical, the matrix D may still be adjusted as per a granularity of an RE, and the matrix U may be determined in advance, such as being determined according to Table 3.

As to steps 402-406, they correspond to a case where i=2, with the processes being similar to what is described above, which shall not be described herein any further.

The above description is given taking that the number of transmitters is n=2, the number of antennas configured for each transmitter $T_i$ is $N_t$=4, and the number of antennas configured for the receiver is $N_r$=2, as an example. The case where the number of antennas configured for each transmitter is $N_t$=2 and the number of antennas configured for the receiver is $N_r=2$ is similar to what is described above, which shall not be described herein any further.

As for a case where the number of antennas configured for the transmitter $T_i$ is $N_t>4$, for example, for the case where 8 antennas, 1, 2, ... 8, are configured, each two neighboring antennas may be mapped as one new equivalent antenna, so that the 8 antennas are transformed into 4 antenna ports. Therefore, such a case may be dealt with as a case of 4 antennas. And there exist correspondingly other manners of mapping, which shall not be enumerated herein any further.

It can be seen from the above embodiment that on the basis of a CDD framework, the transmitter may transmit the data streams to the receiver by using the matrix U, the matrix D and the precoding matrix W, and selects the precoding matrix W by taking an RB as a granularity, so as to support DM-RS demodulation, and the receiver is not needed to perform PMI feedback, which is also applicable to a scenario where user feedback is not supported or PMI feedback is inaccurate, thereby achieving open-loop spatial multiplexing CoMP transmission.

An embodiment of the present invention further provides a transmitter and a receiver, as described in embodiments 4 to 6 below. As the principles of the transmitter and the receiver for solving problems are similar to that of the data transmission method based on a transmitter and a receiver, the implementation of the method may be referred to for the implementation of the transmitter and the receiver, and the repeated parts shall not be described any further.

Figure 5:
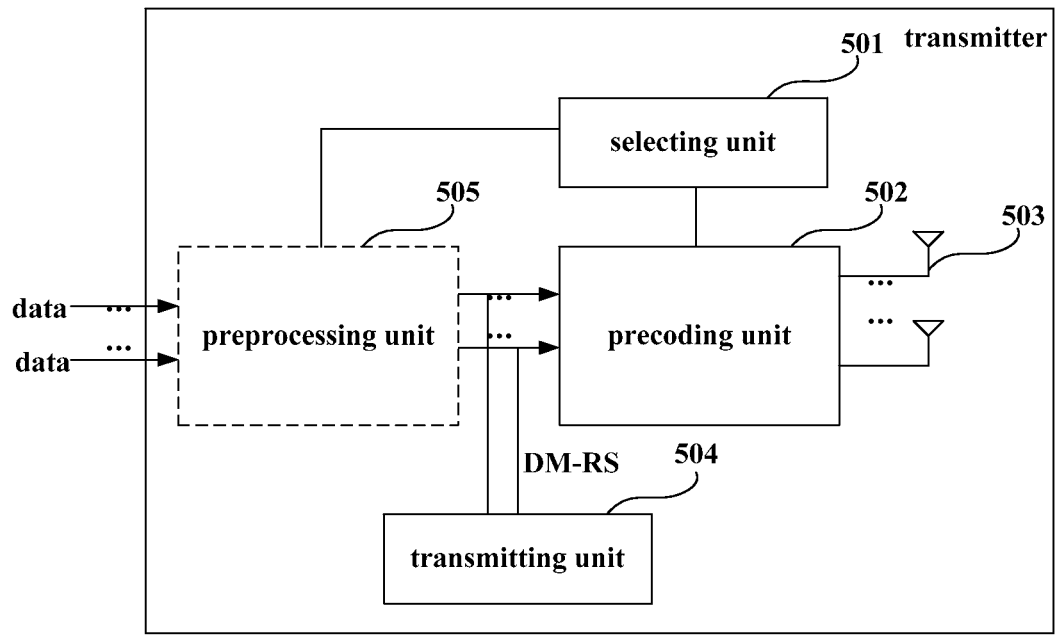
FIG. 5 is a schematic diagram of the structure of the transmitter of Embodiment 4 of the present invention.

FIG. 5 is a schematic diagram of the structure of the transmitter of Embodiment 4 of the present invention. As shown in FIG. 5, the transmitter includes: a selecting unit 501, a precoding unit 502 and multiple antennas 503; wherein, the selecting unit 501 is configured to select a used precoding matrix W by taking an RB as a granularity; the precoding unit 502 is configured to map multiple data streams x to the multiple antennas 503 of the transmitter after precoding the multiple data streams x by using a precoding matrix selected by the selecting unit 501; and the multiple antennas 503 are configured to transmit the multiple data streams x to a receiver.

In this embodiment, the selecting unit 501 may select the precoding matrix in a predefined manner, as described in embodiments 1 and 3, which shall be described below by way of an example.

For example, for the same resource block, the precoding matrix W selected by the selecting unit 501 is identical to or different from precoding matrices selected by other transmitters.

In an embodiment, the selecting unit 501 cyclically selects the precoding matrix W in a predefined order, the number of the precoding matrices used in each cycle being related to the number of antenna ports of the transmitter and being less than or equal to the number of precoding matrices available in a codebook.

In another embodiment, the precoding matrix used by the selecting unit 501 in each cycle is identical to the precoding matrices used by other transmitters, and the selecting unit 501 selects the precoding matrix W in an order different from or identical to that in which other transmitters select precoding matrices, or the selecting unit 501 randomly selects the precoding matrix W used in each cycle.

In this embodiment, when the receiver performs demodulation by using a DM-RS, as shown in FIG. 5, the transmitter further includes a transmitting unit 504 configured to convey a DM-RS into the precoding unit 501; and the precoding unit 501 is further configured to map the DM-RS to the multiple antennas 503 by using the precoding matrix W, and the multiple antennas 503 transmit the DM-RS to the receiver. Wherein, the DM-RS may be obtained in advance.

As shown in FIG. 5, the transmitter further includes a preprocessing unit 505 configured to pass multiple data streams through a unitary matrix before the precoding unit 502 maps the multiple data streams to the multiple antennas 503, so that the multiple data streams experience similar channel conditions, and to pass the data streams through a phase rotation matrix after passing through the unitary matrix, so as to obtain a frequency diversity. And the preprocessing unit 505 is optional.

Figure 6:
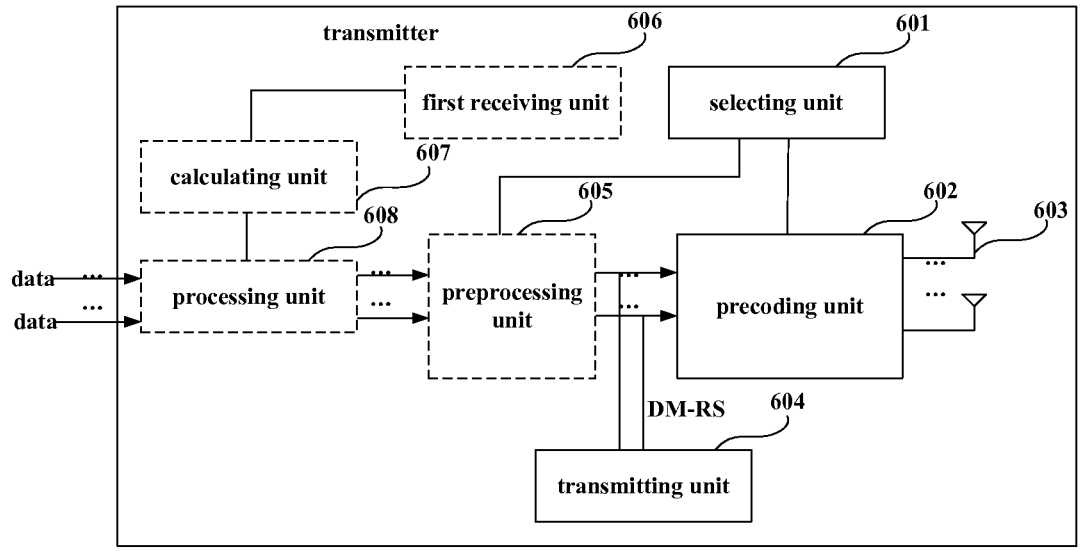
FIG. 6 is a schematic diagram of the structure of the transmitter of Embodiment 5 of the present invention.

FIG. 6 is a schematic diagram of the structure of the transmitter of Embodiment 5 of the present invention. As shown in FIG. 6, the transmitter includes: a selecting unit 601, a precoding unit 602, multiple antennas 603, a transmitting unit 604 and a preprocessing unit 605, with the functions of them being identical as those in Embodiment 4, which shall not be described herein any further.

As shown in FIG. 6, the transmitter further includes:

a first receiving unit 606 is configured to receive a channel quality indicator CQI of an original SU-MIMO transmission and an amount of change ΔCQI of the channel quality indicator fed back by a receiver;

a calculating unit 607 is configured to calculate a channel quality indicator CQI' of a current open-loop CoMP transmission according to the amount of change and the channel quality indicator of the original SU-MIMO transmission received by the first receiving unit 606; and a processing unit 608 is configured to process the multiple data streams according to the current channel quality indicator CQI', and to convey the processed multiple data streams into the precoding unit 602, or to convey the processed multiple data streams into the precoding unit 602 after being processed by the preprocessing unit 605. Wherein, the process of processing of the processing unit 608 is as described in embodiments 1 and 3, which shall not be described herein any further.

In this embodiment, the selecting unit 501 may further be configured to select a matrix D by taking an RE as an granularity, that is, adjusting the matrix D RE by RE, details for selecting the matrix D being as described in Embodiment 2, which shall not be described herein any further. Furthermore, it should be noted that in this embodiment, the selecting unit 501 may be configured to select a precoding matrix W and a matrix D, and the two matrices may be selected by using different selecting units; for example, a first selecting unit selects the precoding matrix W, and a second selecting unit selects the matrix D.

In this embodiment, the transmitter may further includes a storing unit (not illustrated), the matrix U may be predetermined and stored in the storing unit, and the precoding matrix W and the matrix D available for selection may also be stored in the storing unit, for use by the selecting unit 501.

In this embodiment, the transmitter may refer to a base station, such an eNodeB, and an RRH, etc.

Figure 7:
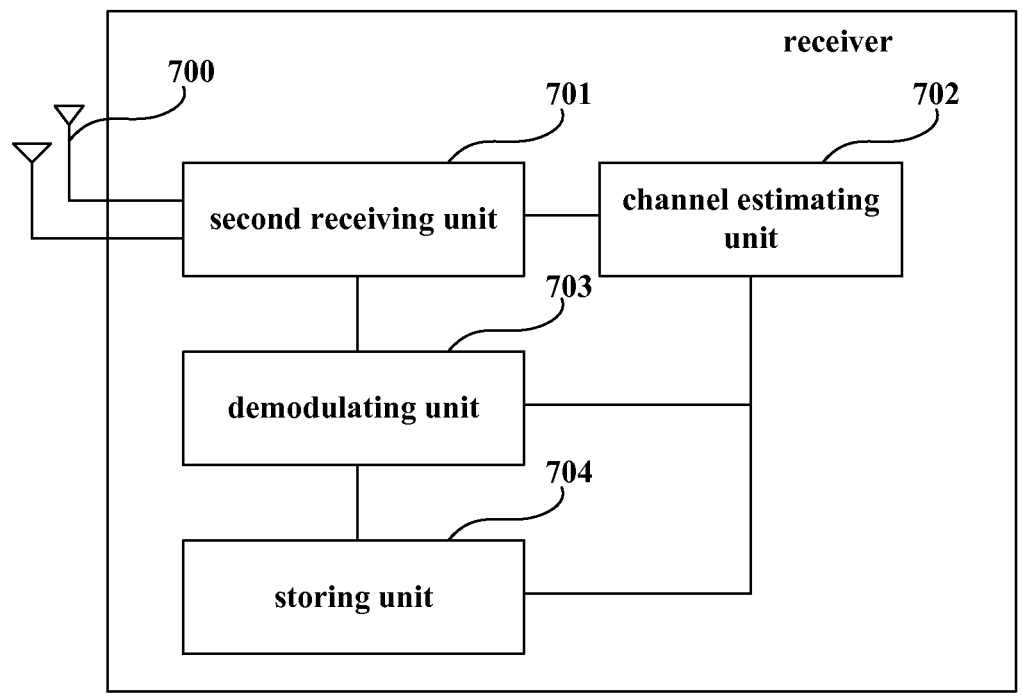
FIG. 7 is a schematic diagram of the structure of the receiver of Embodiment 6 of the present invention.

FIG. 7 is a schematic diagram of the structure of the receiver of Embodiment 6 of the present invention. As shown in FIG. 7, the receiver includes: a second receiving unit 701, a channel estimating unit 702 and a demodulating unit 703; wherein, the second receiving unit 701 is configured to receive data streams transmitted by more than one transmitter via an antenna 700;

the channel estimating unit 702 is configured to perform channel estimation by using a DM-RS, so as to obtain an equivalent channel; wherein, the method for performing channel estimation by the channel estimating unit 702 is as described in embodiments 2 and 3, which shall not be described herein any further;

and the demodulating unit 703 is configured to demodulate the received data streams by using the obtained equivalent channel, or by using the obtained equivalent channel, a matrix D and a matrix U, so as to obtain the data streams x;

wherein, when the transmitter uses the structure shown in FIG. 5, in case of not including the preprocessing unit 605, the demodulating unit 703 performs demodulation recovery on the received data streams by using the obtained equivalent channel. And in case of including the preprocessing unit 605, the demodulating unit 703 performs demodulation on the received data streams by using the obtained equivalent channel, the matrix D and the matrix U, so as to obtain the data streams.

Wherein, the method for performing demodulation recovery to obtain the data streams x by the demodulating unit 703 is as described in embodiments 2 and 3, which shall not be described herein any further.

Furthermore, as shown in FIG. 7, the receiver may further include a storing unit 704 configured to store the information of the equivalent channel obtained by the channel estimating unit 702, and to store a pre-obtained matrix U and a matrix D, so that the demodulating unit 703 performs demodulation recovery on the data streams received by the receiving unit 701, so as to obtain the data streams x.

Furthermore, the receiver may further include a transmitting unit (not illustrated) configured to transmit a channel quality indicator CQI of an original MIMO transmission and an amount of change ΔCQI of the channel quality indicator to the transmitters.

Furthermore, the receiver may further include an information acquiring unit (not illustrated) configured to acquire the above amount of change of the channel quality indicator, with the manner of acquisition being as described in Embodiment 2, which shall not be described herein any further.

In this embodiment, the receiver may be various terminal equipment, such as a mobile phone; and may also be any equipment capable of communicating, such as a game player, a PDA, and a portable computer, etc.

One or more functional blocks and/or one or more combinations of the functional blocks in FIGS. 5, 6 and 7 (such as the selecting unit 501, the precoding unit 502, and the transmitting unit 504, etc.) may be realized as a universal processor, a digital signal processor (DSP), an application-specific integrated circuit, a field programmable gate array (FPGA) or other programmable logic devices, discrete gate or transistor logic devices, discrete hardware component or any appropriate combinations thereof. And one or more functional blocks and/or one or more combinations of the functional blocks in FIGS. 5 and 6 may also be realized as a combination of computing equipment, such as a combination of a DSP and a microprocessor, multiple processors, one or more microprocessors in communication combination with a DSP, or any other such configuration.

Figure 8:
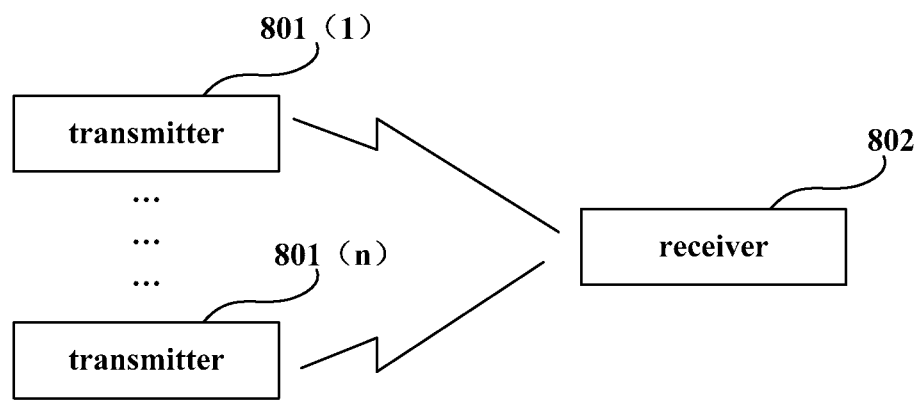
FIG. 8 is a schematic diagram of the structure of the transmission system of Embodiment 7 of the present invention.

FIG. 8 is a schematic diagram of the structure of the data transmission system of Embodiment 7 of the present invention. The system includes more than one transmitter 801(1)~801(n) and a receiver 802;

wherein, the structures of each of the transmitters and the receiver are as shown in FIGS. 5, 6 and 7, which shall not be described herein any further. And the flows for carrying out the transmitters and the receiver in the system are as described in Embodiment 3 shown in FIG. 4, which shall not be described herein any further.

In this embodiment, the selecting units of the multiple transmitters 801(1)~801(n) may select precoding matrices W in a manner described in embodiments 1 and 3. For example, in this embodiment, the selecting units of the multiple transmitters 801(1)~801(n) cyclically select the precoding matrices W in a predefined order, and the precoding matrix used by each transmitter in each cycle may be identical; wherein, the determination of the orders of the used precoding matrices selected by each transmitters in a cyclic shift manner is as described in Embodiment 1, which shall not be described herein any further.

It can be seen from the above embodiment that on the basis of a CDD framework, the transmitter may transmit the data streams to the receiver by using the matrix U, the matrix D and the precoding matrix W, and selects the precoding matrix W by taking an RB as a granularity, so as to support DM-RS demodulation; and the receiver may receive data streams and DM-RSs transmitted by multiple transmitters, performs channel estimation according to the received DM-RSs, so as to obtain an equivalent channel, performs demodulation recovery on the received data streams by using the equivalent channel and the matrices D and U, and is not needed to perform PMI feedback, which is also applicable to a scenario where user feedback is not supported or PMI feedback is inaccurate, thereby achieving open-loop spatial multiplexing CoMP transmission.

An embodiment of the present invention further provides a computer-readable program, wherein when the program is executed in a transmitter, the program enables a computer to carry out the data transmission method as described in embodiments 1 and 3 in the transmitter.

An embodiment of the present invention further provides a storage medium in which a computer-readable program is stored, wherein the computer-readable program enables a computer to carry out the data transmission method as described in embodiments 1 and 3 in a transmitter.

An embodiment of the present invention further provides a computer-readable program, wherein when the program is executed in a receiver, the program enables a computer to carry out the data transmission method as described in embodiments 2 and 3 in the receiver.

An embodiment of the present invention further provides a storage medium in which a computer-readable program is stored, wherein the computer-readable program enables a computer to carry out the data transmission method as described in embodiments 2 and 3 in a receiver.

Although particular embodiments of the present invention are described in this application, those skilled in the art may design variants of the present invention on the basis of not departing from the concept of the present invention.

For example, the above system may support, besides DM-RS demodulation, demodulation of a cell reference signal, a transmitter may transmit the CRS to a receiver, and the receiver may perform demodulation according to the CRS.

The above apparatuses and methods of the present invention may be implemented by hardware, or by hardware in combination with software. The present invention relates to such a computer-readable program that when the program is executed by a logic device, the logic device is enabled to carry out the apparatus or components as described above, or to carry out the methods or steps as described above. The present invention also relates to a storage medium for storing the above program, such as a hard disk, a floppy disk, a CD, a DVD, and a flash memory, etc.

The present invention is described above with reference to particular embodiments. However, it should be understood by those skilled in the art that such a description is illustrative only, and not intended to limit the protection scope of the present invention. Various variants and modifications may be made by those skilled in the art according to the spirits and principle of the present invention, and such variants and modifications fall within the scope of the present invention.

What is claimed is:

1. A transmitter, comprising:
   a preprocessing unit configured to pass multiple data streams through a unitary matrix and to pass outputted data streams through a phase rotation matrix;
   a selecting unit configured to select the phase rotation matrix by taking a resource element as granularity; and select a used precoding matrix by taking a resource block as a granularity;
   a precoding unit configured to map multiple data streams outputted from the preprocessing unit to multiple antennas of the transmitter by using the precoding matrix; and
   multiple antennas configured to transmit the multiple data streams to a receiver;
   wherein, the selecting unit cyclically selects the precoding matrix in a predefined order, the number of the precoding matrices used in each cycle being related to the number of antenna ports of the transmitter and being less than or equal to the number of precoding matrices available in a codebook;
   wherein the precoding matrix used by the selecting unit in each cycle is identical to the precoding matrices used by other transmitters, but the selecting unit selects the precoding matrix in an order different from or identical to that in which other transmitters select precoding matrices.

2. The transmitter according to claim 1, wherein for the same resource block, the precoding matrix selected by the selecting unit is identical to or different from precoding matrices selected by other transmitters;
   the coordinated precoding matrix selection is determined by predefined rules.

3. The transmitter according to claim 1, wherein,
   when the number of the antenna ports is 2, the used precoding matrices are 3 or any 2 of 3 precoding matrices to which a two-antenna codebook corresponds;
   and when the number of the antenna ports is 4, the used precoding matrix is any N precoding matrix of 16 precoding matrices to which a four-antenna codebook corresponds, wherein N≤16.

4. The transmitter according to claim 1, wherein
   the transmitter further comprises a transmitting unit configured to convey a demodulation reference signal into the precoding unit;
   and the precoding unit is further configured to transmit the demodulation reference signal to the multiple antennas by using the precoding matrix, and the antennas transmits the demodulation reference signal to the receiver.

5. The transmitter according to claim 1, wherein the transmitter further comprises:
   a first receiving unit configured to receive a channel quality indicator and an amount of change of the channel quality indicator fed back by the receiver;
   a calculating unit configured to calculate a current channel quality indicator according to the amount of change and the channel quality indicator received by the first receiving unit; and
   a processing unit configured to process the multiple data streams according to the current channel quality indicator, and to convey the processed multiple data streams into the precoding unit.

6. A system, comprising:
   a second receiving unit configured to receive data streams transmitted by more than one transmitter;
   a channel estimating unit configured to perform channel estimation by using a demodulation reference signal, so as to obtain an equivalent channel; and
   a demodulating unit configured to demodulate the received data streams by using the obtained equivalent channel, a phase rotation matrix and a unitary matrix, so as to obtain the data streams;
   wherein, multiple data streams are received by the second receiving unit after being processed by the transmitter by:
   passing the multiple data streams through a unitary matrix and passing outputted data streams through a phase rotation matrix; wherein the transmitter selects the phase rotation matrix by taking a resource element as granularity;
   mapping the outputted multiple data streams to multiple antennas of the transmitter by using a precoding matrix; wherein the transmitter selects the used precoding matrix by taking a resource block as a granularity;
   transmitting the multiple data streams by the multiple antennas to the receiver;
   wherein, the transmitter cyclically selects the precoding matrix in a predefined order, the number of the precoding matrices used in each cycle being related to the number of antenna ports of the transmitter and being less than or equal to the number of precoding matrices available in a codebook;
   wherein the precoding matrix used by the transmitter in each cycle is identical to the precoding matrices used by other transmitters, but the transmitter selects the precoding matrix in an order different from or identical to that in which other transmitters select precoding matrices.

7. The system according to claim 6, wherein the receiver further comprises a transmitting unit configured to transmit a channel quality indicator and an amount of change of the channel quality indicator to the transmitters.

8. A data transmission system, comprising:
   more than one transmitter, each of the transmitters comprising:
      a preprocessing unit configured to pass multiple data streams through a unitary matrix and to pass outputted data streams through a phase rotation matrix;
      a selecting unit configured to select the phase rotation matrix by taking a resource element as granularity, and select a used precoding matrix by taking a resource block as a granularity;
      a precoding unit configured to map multiple data streams outputted from the preprocessing unit to multiple antennas of the transmitter by using the precoding matrix selected by the selecting unit; and
      multiple antennas configured to transmit the multiple data streams to a receiver; and
   the receiver, comprising
      a receiving unit configured to receive data streams transmitted by more than one transmitter;
      a channel estimating unit configured to perform channel estimation by using a demodulation reference signal, so as to obtain an equivalent channel; and
      a demodulating unit configured to demodulate the received data streams by using the obtained equivalent channel, a phase rotation matrix and a unitary matrix, so as to obtain the data streams,
   wherein, the selecting unit of the multiple transmitters cyclically selects the precoding matrix in a predefined order, the number of the precoding matrices used in each cycle being related to the number of antenna ports of the transmitter and being less than or equal to the number of precoding matrices available in a codebook, and wherein the precoding matrix used by the selecting unit in each cycle is identical to the precoding matrices used by other transmitters, but the selecting unit selects the precoding matrix in an order different from or identical to that in which other transmitters select precoding matrices.

9. The system according to claim 8, wherein the order in which each of the transmitters selects the used precoding matrix is determined in a cyclic shift manner.

10. The system according to claim 8, wherein when the number of the transmitters is 2, the selecting unit of one of the transmitters cyclically selects the precoding matrix in a predefined order, and the selecting unit of the other one of the transmitters cyclically selects the precoding matrix W in an order reverse to that of the one of the transmitters; or the selecting unit of one of the transmitters cyclically selects the precoding matrix W in a predefined order, and the selecting unit of the other one of the transmitters randomly selects the precoding matrix.

* * * * *